Aug. 30, 1938.   R. E. BRIGGS   2,128,347
METHOD OF AND MEANS FOR TREATING SEWAGE
Filed Dec. 24, 1935   2 Sheets-Sheet 1
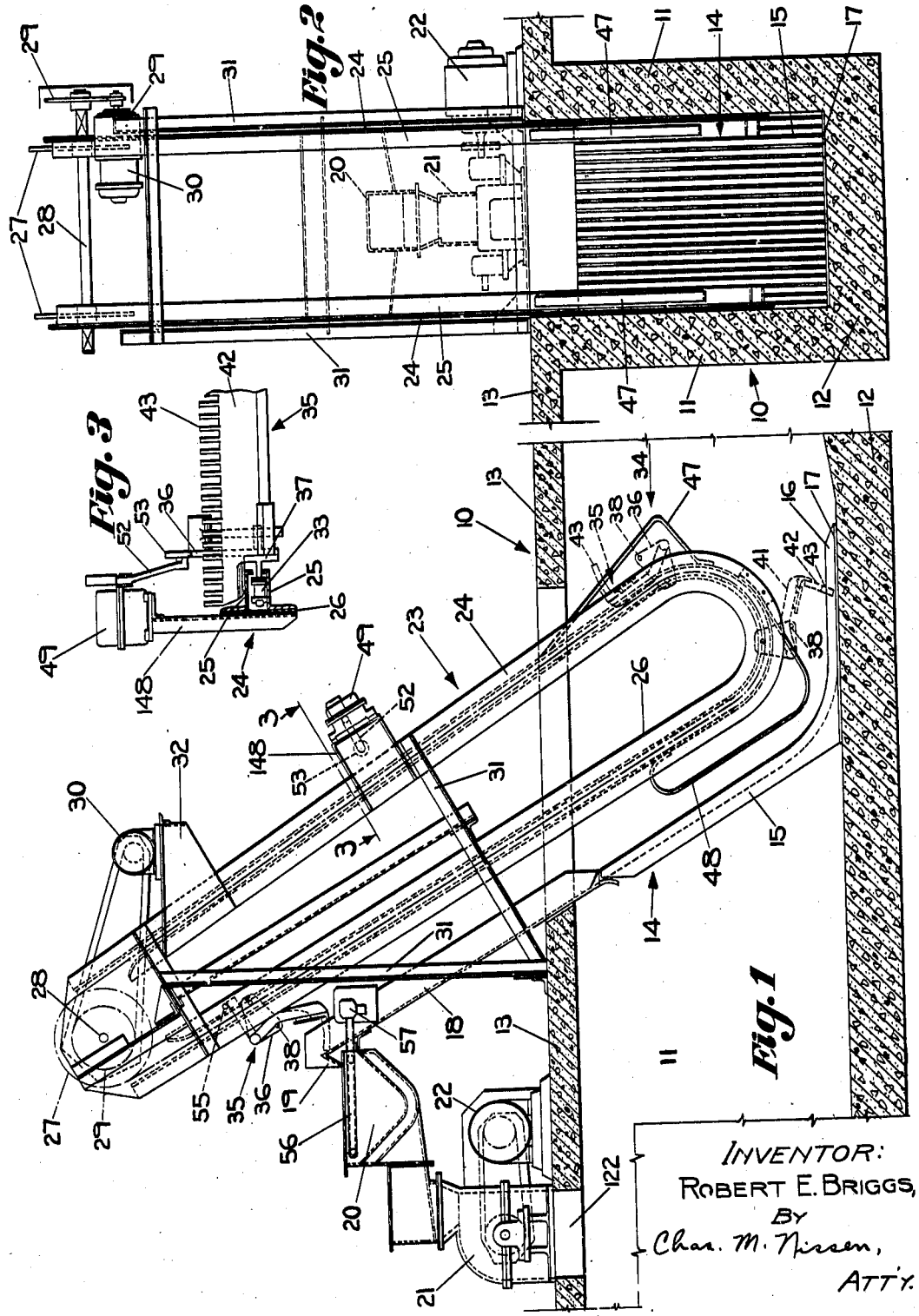
INVENTOR:
ROBERT E. BRIGGS,
BY
Chas. M. Nissen,
ATT'Y.

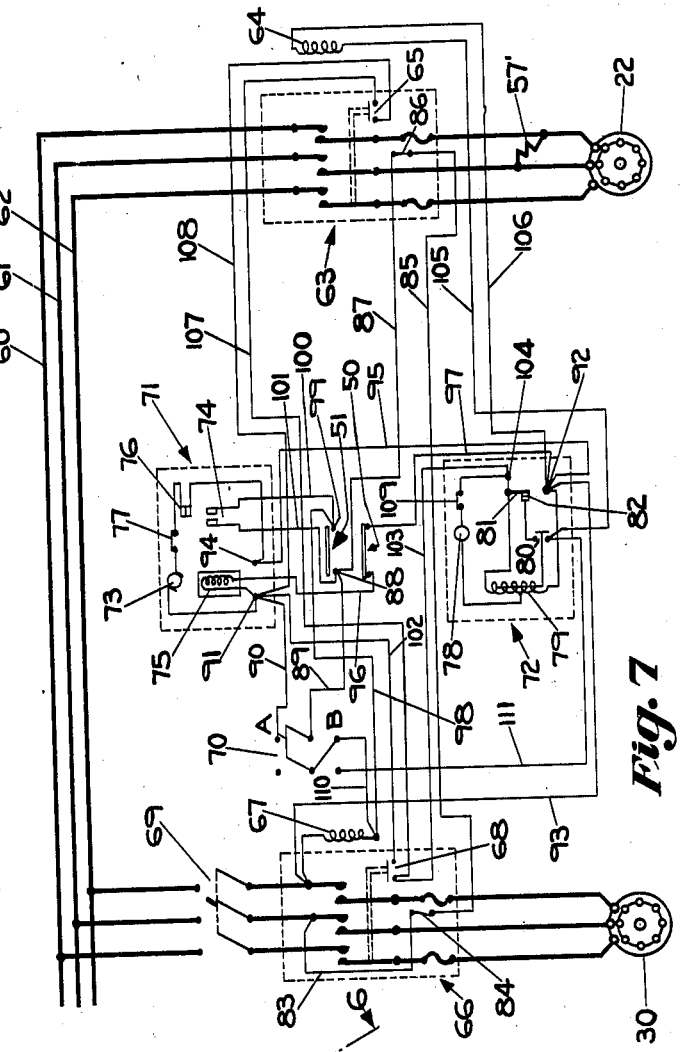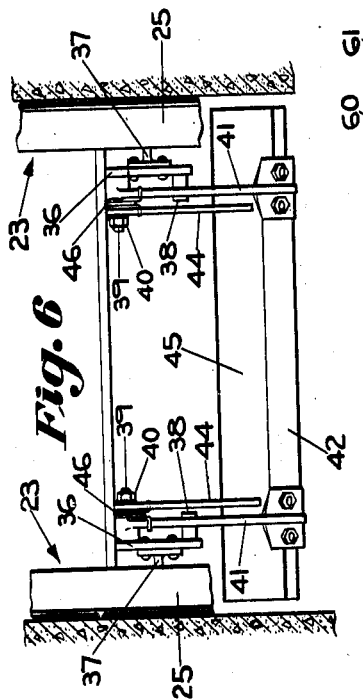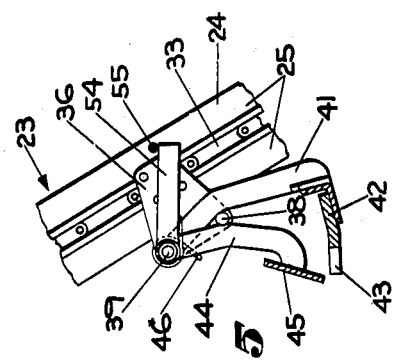
Aug. 30, 1938.   R. E. BRIGGS   2,128,347
METHOD OF AND MEANS FOR TREATING SEWAGE
Filed Dec. 24, 1935   2 Sheets-Sheet 2
INVENTOR:
ROBERT E. BRIGGS,
By
Chas. M. Nissen,
ATT'Y.

Patented Aug. 30, 1938

2,128,347

UNITED STATES PATENT OFFICE 2,128,347

METHOD OF AND MEANS FOR TREATING SEWAGE

Robert E. Briggs, Columbus, Ohio, assignor to The Jeffrey Manufacturing Company, a corporation of Ohio Application December 24, 1935, Serial No. 56,015

5 Claims. (Cl. 210—176)

This invention relates to a method and means for treating sewage in which a sewage channel is screened of large particles at predetermined intervals, the screenings being mechanically ground with water to reduce them to a pulp after which they are returned to the sewage stream, the entire method being carried out by mechanical automatic means, thus requiring no direct supervision.

Another object of the invention is to provide an improved system for automatically treating sewage in the manner above mentioned.

Another object of the invention is to provide an improved self-cleaning sewage bar screen.

Other objects of the invention will appear hereinafter, the novel features and combinations being set forth in the appended claims.

In the accompanying drawings,

Fig. 1 is a side elevational view of the improved screen and associated apparatus comprising my invention, shown in relation to a sewage channel, illustrated in longitudinal section.

Fig. 2 is an end upstream view of the device of Fig. 1 showing the channel in transverse section;

Fig. 3 is a detailed view of the rake operated switch mechanism and taken on line 3—3 of Fig. 1, looking in the direction of the arrows;

Fig. 4 is an enlarged detail view of the rake and rake cleaning mechanism;

Fig. 5 is a view similar to Fig. 4 with the rake cleaning mechanism moved to rake cleaning position;

Fig. 6 is a view on lines 6—6 of Fig. 4 looking in the direction of the arrows; and Fig. 7 is a wiring diagram of my system.

In the operation of a sewage treatment plant it is desirable to screen the raw sewage, thereby to remove large particles of material which, if not removed, would tend to disrupt the proper operation of the plant, for example, by becoming clogged in pumps, thus rendering the pumps inoperative.

The accumulation of material derived from raking the screens presents a somewhat serious problem. In the process of my invention this accumulated material is ground into a pulp and returned to the sewage stream. Due to the reduced size of the material it may be easily handled by the pumps and settled out with the sludge in the primary settling tanks of the sewage treatment system. The method and apparatus herein disclosed is one in which the material is removed intermittently from the screen and discharged into a grinder to which is fed a stream of water to aid in the grinding and reduction of the accumulated material.

It is also preferred that the entire system be made automatic so that continuous attention is not required, and the system will operate in a satisfactory manner at all times. The cycle of operation of the automatic system will be described in detail hereinafter.

Referring particularly to Figs. 1 and 2, there is seen mechanism for carrying out my method, which mechanism also comprises my invention. A sewage trough or channel 10 is provided which may be made of poured concrete and comprises side walls 11, 11, bottom 12 and top wall 13. The top wall 13 may also comprise a floor of the building which houses the screen equipment.

Extending downwardly into the channel 10 is a screen 14 which may be of the construction disclosed and claimed in my United States Patent application for a Bar screen scraper, Serial No. 740,159, filed August 16, 1934. Briefly described, this screen comprises a plurality of spaced upwardly inclined bars 15 set on edge, which extend into integral horizontal portions 16 adjacent the bottom of said screen 14. Anchor plate 17 is rigidly attached to the bottoms of the extension 16, as by welding, and is anchored to the bottom 12 of the channel 10. Adjacent its top the screen 14 terminates in a flat bottom trough 18, the top of which is provided with a discharge chute 19 leading to a hopper 20 associated with a grinder 21 driven from a motor 22.

Associated with the screen 14 is a rake operated mechanism 23 which, in general, is of the construction disclosed and claimed in my above mentioned application, Serial No. 740,159, and also disclosed and claimed in my application, Serial No. 701,548 for a Material handling apparatus, filed December 8, 1933. Said rake operating mechanism 23 comprises a pair of substantially U-shaped guides 24, 24, each of which comprise a pair of parallel spaced plates 25, 25 (see Fig. 3) which are rigidly attached to a flat side plate 26, by integral flanges.

Adjacent the open and top portion of each of the U-shaped guides 24, 24 there is provided a sprocket 27, both of said sprockets being carried on a shaft 28 driven through reduction mechanism 29 from a motor 30. The rake operating mechanism 23 is rigidly mounted upon the top wall or floor 13 by a frame 31 formed of appropriate angle members. The motor 30 may be mounted upon a bracket 32 forming a portion of the frame 31. Each of the U-shaped guides 24, 24 provides a guide means for an endless chain 33 which is adapted to travel down into the channel 10 and into the sewage which flows in said channel in the direction indicated by the arrow 34. It is to be noted that due to the particular U-shaped guides 24, 24 there is a complete absence of any guiding and supporting sprockets within the sewage stream.

Extending between the chains 33 I provide a rake mechanism 35 adapted to remove from the screen 14 the accumulated refuse or sewage, and to discharge it into the hopper 20. As illustrated in the drawings there is one such rake mechanism 35 though the number may be increased, if desired.

Said rake mechanism 35 comprises a pair of plates 36, 36 (Fig. 6) which are rigidly attached to links of the chains 33, 33 as by brackets 37, 37. Each of said plates 36, 36 is provided with an inwardly extending stop 38 and with an inwardly extending bolt 39 adapted to receive a nut 40. Pivotally mounted upon each of said bolts 39 is a lever 41. Extending between the two levers 41 is a rake plate 42 provided with teeth 43. Also pivoted upon each of the bolts 39 is a second lever 44.

Between said levers 44 there extends a wiper plate 45 which is adapted to wipe material from the rake plate 42, when said rake mechanism 35 is positioned adjacent the chute 19. The wiper plate 45 is biased to the non-operating position illustrated in Fig. 4 by a pair of coil springs 46, 46 associated with the levers 41 and 44.

Associated with each of the U-shaped guides 24, 24 is a cam 47 which is adapted to tilt the rake mechanism 35 about the bolts 39 and to move the arms 41 from the position illustrated adjacent said cam at the bottom of Fig. 1 to a position in which said arms contact stop lugs 38. This prevents a sudden falling of the rake mechanism as it reaches the bottom of the channel 10, which, if allowed, would produce an undesirable shock upon the mechanism. This feature is disclosed and claimed in my above mentioned patent application, Serial No. 701,548.

Also associated with each of the U-shaped guides 24, 24 is a spring cam 48 which is adapted to maintain resiliently an interleaving relation between the teeth 43 of the rake mechanism 35 and the screen 14. This construction is disclosed and claimed in my above mentioned application, Serial No. 740,159.

It is also to be noted that there is mounted upon a bracket 148 carried by one of the U-shaped guides 24, 24 a control box 49 within which is housed a pair of switches 50 and 51 (see Fig. 7). An operating lever 52 is associated with said switches so that under normal conditions switch 50 is closed and switch 51 is open. The lever 52 carries a roller 53 adapted to be engaged by one of the plates 36 as rake mechanism 35 passes under said control box 49. It will thus be evident that the switches 50 and 51 will be operated whenever rake mechanism 35 passes under the control box 49.

In the operation of the rake mechanism the plate 42 and teeth 43 will gather accumulated material on the screen 14 and carry it up the trough 18 until the chute 19 is reached. At this position upstanding levers 54, 54 which are rigidly attached to the arms 44, 44, will engage stationary pins 55, 55 extending inwardly from the U-shaped guide plates 24, 24. As a consequence, the levers will rock about the axis of bolts 39, 39 and 44, 44 will rock about the axis of the rake plate 42 and teeth 43 thus wipe from the rake plate 42 and teeth 43 any material or sewage which is carried thereon, forcing it to the chute 19 by which it is directed to hopper 20. This operation is clearly illustrated by reference to Figs. 4 and 5 of the drawings. The rake operating mechanism will continue until the plate 36 engages roller 53 to operate switches 50 and 51 in a manner which will be hereinafter described more in detail.

Associated with the hopper 20 and adjacent the top thereof is a water spray 56 which will be operative to carry received material to the grinder 21. Spray 56 may take the form of a circumferential pipe provided with a plurality of drilled apertures. This water spray is connected to a source of water supply and is controlled by a solenoid operated valve 57. The valve 57 is controlled by solenoid 57' (Fig. 7) and operates at the same time the grinder motor 22 operates. The grinder will, of course, grind received material and discharge it as a pulp into channel 10 through opening 122 in floor 13.

Attention is directed to Fig. 7 which illustrates the electrical circuit for controlling the mechanism above described in detail. 60, 61 and 62 are power means of a three phase power system which supply power to the rake motor 30 and the grinder motor 22, both of which may be three phase induction type motors.

It is to be noted that associated with lines 60 and 61 and adjacent the grinder motor 22 I provide a solenoid 57' which operates the water valve 57 whereby water valve 57 will always be opened when the grinder motor 22 is energized. As a consequence water will always be supplied to the hopper 20 when it is desired to grind any material, thus facilitating the grinding and keeping the grinder clean and free of accumulating sewage.

Associated with the grinder motor 22 is a magnetically operated switch 63 by which said motor 22 is connected to the power mains 60, 61 and 62. Said switch 63 is biased to normal open position and is closed whenever the operating coil 64 thereof is energized. Associated with said switch 63 is a pilot switch 65 which controls certain control circuits, said pilot switch 65 being closed whenever said switch 63 is closed.

Associated with the rake motor 30 I provide a magnetic switch 66, which is the same construction as the switch 63, having an operating coil 67 and a pilot switch 68. In the power mains 60, 61 and 62 leading to the switch 66 I also provide a hand operated knife disconnecting switch 69.

The control means for said magnetic switches 63 and 66 comprises a hand operated knife switch 70, which, when in the position A provides for intermittent automatic operation of the system, as will be hereinafter described, and when in position B provides for continuous operation of the system.

In addition to the circuit connections for said control system I also provide a pair of timing relays 71 and 72. It may be mentioned that the relays 71 is preferably of the type known commercially as the TSA-10 automatic timer manufactured by The General Electric Company, which may be constructed generally after the disclosure of the patent to Chester O. Hall, No. 1,483,443, dated February 12, 1924, except for certain minor obvious changes; and the relay 72 may be of the type commercially known as the CR-2820-1099 definite time relay, manufactured by The General Electric Company, which may generally follow the disclosure of the patent to Hugh M. Stephenson, No. 1,699,125, dated January 15, 1929, except for certain minor changes.

Briefly described, relay 71 comprises a small synchronous motor 73 which drives an operating pointer, which, after a predetermined adjustable movement, will operate to close contacts 74 and maintain them closed until an electromagnetic clutch 75 is de-energized, whereupon the above mentioned pointer will return to its normal zero position under the influence of a biasing spring. I have provided a pair of normally closed safety contacts 76, along with a normally closed push button switch 77, in series with circuit of motor 73, said safety contacts 77 being opened in case the above mentioned pointer reaches its extreme position of travel before the magnetic clutch 75 is de-energized.

The relay 72, briefly described, comprises a synchronous motor 78, one terminal of which is connected to an intermediate point on a solenoid 79, with which solenoid is associated an armature which controls a switch 80. This relay is so constructed that upon energization of the solenoid 79 the armature thereof will operate to engage gears, one of which is driven from the motor 78, and the other of which is connected to a timing cam which is biased to a zero position by a coil spring. When the engagement takes place between said gears and the motor 78 is operated, the cam rotates a predetermined variable amount until it rocks a pivot lever 81 to open contacts 82.

The operation of the control system will be evident from a description of a typical cycle of movement of the rake mechanism with the consequent operation of the grinder mechanism. Assume, for example, that it is desired to operate the system automatically and it is desired to clean the screen 14 once every fifteen minutes, the switch 70 will be thrown to the position A, which is the automatic position, and the knife switch 69 will be closed. Under these conditions a circuit will be established from power main 61 through conductor 83, overload cut-out switch 84, conductor 85, overload cut-out switch 86, conductor 87 to terminal 88 of normally open switch 51, thence over conductor 89, through switch 70, conductor 90 to terminal 91 of relay 71. It is thus to be noted that terminal 91 of relay 71 is connected directly to power main 61 through overload cut-out switches 84 and 86 whenever switch 70 is in position A.

Power main 62 is connected directly to terminal 92 of relay 72 over conductor 93. Power from the main 62 is conducted from terminal 92 of relay 72 to terminal 94 of relay 71 over conductor 95. Between the terminals 91 and 94, which are thus connected respectively to mains 61 and 62, there is a circuit for the synchronous motor 73 which includes the push button switch 77 and safety contacts 76, which circuit is obvious. In addition, a circuit is provided for the solenoid of magnetic clutch 75 from terminal 91 to terminal 92 by way of conductor 96, switch 50 and conductor 97. Thus, to start the cycle of operation, magnetic clutch 75 is energized and synchronous motor 73 starts to operate, thereby moving the above mentioned pointer so that after a predetermined time interval it will move to close contacts 74. A normal setting of this relay will be such that contacts 74 will be closed fifteen minutes after magnetic clutch 75 is energized. As a consequence, the screen 14 will be cleaned and the grinder 21 will be set into operation intermittently every fifteen minutes. After the fifteen minute period has expired, the above mentioned pointer will close contacts 74 of relay 71 and a circuit will be closed for operating coil 67 of magnetic switch 66, thereby to start the operation of the rake motor 30, over a circuit which may be traced from power main 62, coil 67, conductor 98, terminal 99 of switch 51, conductor 100, contacts 74, conductor 101, terminal 88 of switch 51, which, as was previously described, is connected to power main 61 over conductors 83, 85 and 87 and cut-out switches 84 and 86. Operating coil 67 being thus energized, the contacts of magnetic switch 66 are closed, and the rake motor 30 starts to operate, thereby moving the rake along the guides 24, 24.

When magnetic switch 66 closed, it closed the contacts of switch 68 which transfers power from the terminal 91 of relay 71 over conductors 102 and 103 to terminal 104 of relay 72. Connected between the terminals 104 and 92 of said relay 72 is solenoid 79, which is thus energized. At the same time the synchronous motor 78 of said relay 72 is energized. As a consequence of the energization of solenoid 79, switch 80 will be closed immediately transferring power from terminal 104 through contacts 82, switch 80, conductor 105, operating coil 64 of magnetic switch 63 and conductor 106 to terminal 92. As a consequence, operating coil 64 will be energized, closing magnetic switch 63 and starting the operation of grinder motor 22 and the opening of the water valve 57. As a consequence the grinder will be starting into operation with water flowing into the hopper 20 ready to receive and grind any sewage or refuse, and to discharge it as a pulp into the sewage stream. At the same time that solenoid 79 is energized, the motor 78 of relay 72 started its operation, which, after a predetermined period, will result in the opening of contacts 82. The consequence of this opening will be later described.

After the rake mechanism has been set in motion by the rake motor 30 with the grinder motor 22 operating the grinder 21 and the water valve 57 opened as aforesaid, the rake mechanism will operate to deliver material to the hopper 20 in the manner previously described. The rake mechanism will continue its operation until the plate 36 engages roller 53 to rock arm 52, thereby to open the normally closed switch 50 and to close the normally open switch 51. When normally closed switch 50 is opened the previously traced circuit to the solenoid of magnetic clutch 75 will be broken. As a consequence, the relay 71 will restore to its normal position and will begin a new time cycle as soon as said solenoid of magnetic clutch 75 is again operated. This will take place immediately because the rake continues to operate to a position sufficient to close the normally closed switch 50. This is insured by virtue of the fact that when normally closed switch 50 opens normally open switch 51 closes, thus bridging the terminals 88 and 99 of said switch 51. This insures that operating coil 67 will remain energized until the rake motor moves the rake mechanism to a position to close switch 50 and open switch 51.

It is desired that the grinding mechanism operate for a period after the sewage has been discharged thereinto and after the rake mechanism has ceased to operate. In general, this may be two or three minutes. To effect this mode of operation the relay 72 is so adjusted that it will maintain the grinder motor and valve 72 in operation for a period after the rake motor has been stopped. As was previously mentioned, the synchronous motor 78 of said relay 72 starts to operate as soon as the rake motor and the grinder motor are energized. After a predetermined adjustable period contacts 82 of relay 72 will be opened. This will break the previously traced circuit leading to the operating coil 64 of magnetic switch 63, which will result in the de-energization thereof and the opening of the circuit to grinder motor 22. As a consequence, relay 72 will restore to its normal position due to the fact that the previously mentioned circuit to said solenoid 79 and motor 78 is broken by virtue of the fact that switches 65 and 68 are now both open. In this connection it is to be noted that switches 65 and 68 are connected in parallel over conductors 102, 107 and 108. As a consequence, when switch 68 was opened upon the de-energization of operating coil 67, the relay 72 was still energized over parallel switch 65 which had been closed in the meantime, as previously described. It may also be mentioned that a push button switch 109 may be included in the circuit of motor 78 if desired.

To operate the system continuously, under which conditions the rake motor, the grinder motor and the solenoid are continuously operated, it is only necessary to move the switch 70 to the position B. Under these conditions operating coil 67 will be connected directly across the lines 61 and 62 over obvious circuits, including those previously traced, and from terminal 88, conductor 89, switch 70, conductor 110, to coil 67. This insures the continuous operation of rake motor 30. Operating coil 64 will be connected in parallel with operating coil 67 over a circuit including conductor 93, terminal 92, conductor 106, coil 64, conductor 105, conductor 111, switch 70, conductor 110, conductor 89, to terminal 88, which, as previously described, is connected to main 61.

It is thus seen that a system is provided which will screen a sewage stream of large particles of material, will automatically clean said screen of accumulated material and grind it, with water, to a pulp after which it is returned to the stream. Due to this reduced condition the material can be easily handled by the subsequent sewage treating mechanism. The entire system is automatic, and may be operated intermittently, or continuously, and when operated intermittently the grinding apparatus will continue in operation for a predetermined period after the rake has been stopped. This insures a complete grinding of all material and, due to the supplying of water to the grinder, insures that it will be thoroughly cleaned out after each grinding operation. This provides a new and improved method of treating sewage to reduce to small particles any large particles in the sewage stream.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In liquid screening apparatus, the combination with a screen adapted to extend into a sewage stream, of means for cleaning said screen of accumulated materials, a grinder, means adapted to feed material cleaned from said screen to said grinder, and automatic control means for said grinder and cleaning means adapted to operate them periodically together and to continue the operation of said grinder for a period after said cleaning means has stopped.

2. In liquid screening apparatus, the combination with a trough, of a screen extending into said trough, a pivoted rake mechanism, means for guiding said rake mechanism across said screen to clean it, said rake mechanism comprising spaced parallel plates, a rake plate having teeth, levers pivotally connecting said plate to said plates, scraper mechanism for said rake including levers also pivoted to said plates and a scraper plate extending therebetween, means for operating said scraper mechanism to clean said rake when a predetermined position is reached by said rake mechanism, and resilient cam means for maintaining said rake mechanism in operative relation with said screen.

3. In a liquid screening apparatus, the combination with a screen adapted to extend into a sewage stream, of a grinder, rake means for cleaning said screen of accumulated materials and delivering them immediately to said grinder, means including said grinder adapted to grind said material and return it to said stream, means for supplying water to said grinder to aid in grinding said material, and control means for operating said rake means, said grinder and said water supply means, said control means being constructed and arranged to operate said rake means, grinder and water supply means periodically together and to discontinue the operation of said rake means while prolonging the operation of said grinder and water supply means.

4. In a liquid screening apparatus, the combination with a screen adapted to extend into a sewage stream, of rake means for cleaning said screen of accumulated materials, a grinder adapted to be fed material cleaned from said screen and to grind it and return it to said stream, means for supplying water to said grinder to aid in grinding said material, and control means for operating said rake means, said grinder and said water supply means, said control means comprising a first timing relay constructed and arranged to operate said rake means periodically through a predetermined cycle and to start the operation of said grinder and water supply means, and a second timing relay constructed and arranged to prolong the operation of said grinder and water supply means after said rake means is stopped.

5. In a liquid screening apparatus, the combination with a screen adapted to extend into a sewage stream, of rake means for cleaning said screen of accumulated materials, a grinder adapted to be fed material cleaned from said screen and to grind it and return it to said stream, means for supplying water to said grinder to aid in grinding said material, and control means for operating said rake means, said grinder and said water supply means, said control means comprising a first timing relay constructed and arranged to operate said rake means periodically through a predetermined cycle and to start the operation of said grinder and water supply means, a second timing relay constructed and arranged to prolong the operation of said grinder and water supply means after said rake means is stopped, and means for rendering said timing relays inactive and operating said grinder, said rake means and said water supply means continuously.

ROBERT E. BRIGGS.